United States Patent
de Neve et al.

(10) Patent No.: US 12,478,916 B2
(45) Date of Patent: Nov. 25, 2025

(54) DIRECT CARBON DIOXIDE CAPTURE FROM AIR

(71) Applicant: Nederlandse Organisatie voor toegepast-natuurwetenschappelijk Onderzoek TNO, s-Gravenhage (NL)

(72) Inventors: Hans de Neve, The Hague (NL); Wilhelmus Jozef Soppe, The Hague (NL); Johannis Alouisius Zacharias Pieterse, The Hague (NL); Gerard Douwe Elzinga, The Hague (NL); Cornelis Hendrikus Frijters, The Hague (NL); Catharina Henriette Maria van der Werf, The Hague (NL)

(73) Assignee: Nederlandse Organisatie voor toegepast-natuurwetenschappelijk Onderzoek TNO, 's-Gravenhage (NL)

( * ) Notice: Subject to any disclaimer, the term of this patent is extended or adjusted under 35 U.S.C. 154(b) by 1084 days.

(21) Appl. No.: 17/422,777

(22) PCT Filed: Jan. 20, 2020

(86) PCT No.: PCT/EP2020/051298
§ 371 (c)(1),
(2) Date: Jul. 14, 2021

(87) PCT Pub. No.: WO2020/148460
PCT Pub. Date: Jul. 23, 2020

(65) Prior Publication Data
US 2022/0072471 A1    Mar. 10, 2022

(30) Foreign Application Priority Data
Jan. 18, 2019 (EP) .................................. 19152632

(51) Int. Cl.
*B01D 53/06* (2006.01)
*B01D 53/22* (2006.01)
(Continued)

(52) U.S. Cl.
CPC ........... *B01D 53/06* (2013.01); *B01D 53/229* (2013.01); *B01D 69/02* (2013.01);
(Continued)

(58) Field of Classification Search
None
See application file for complete search history.

(56) References Cited

U.S. PATENT DOCUMENTS 9,028,592 B2 * 5/2015 Eisenberger ............. B01J 20/22
                                                    95/107
10,512,880 B2 * 12/2019 Eisenberger ........... B01J 20/327
(Continued)

FOREIGN PATENT DOCUMENTS

AT          10125 U2  *  3/2008
CN      112851007 A  *  5/2021  ................ C02F 9/00
(Continued)

OTHER PUBLICATIONS

FR 2826877 (Year: 2003).*
(Continued)

*Primary Examiner* — Brit E. Anbacht
(74) *Attorney, Agent, or Firm* — Ipsilon USA—NLO

(57) ABSTRACT

The present invention concerns a device and process for capturing $CO_2$ from air. The device comprises (a) a membrane at least partly permeable for air comprising a solid state $CO_2$ sorbent; (b) at least one sorption chamber; (c) at least one regeneration chamber; (d) means for transporting the membrane from the sorption chamber to the regeneration chamber and back; (e) an inlet for receiving air located on one end of the membrane and an outlet for discharging air (Continued)

Figure 1:
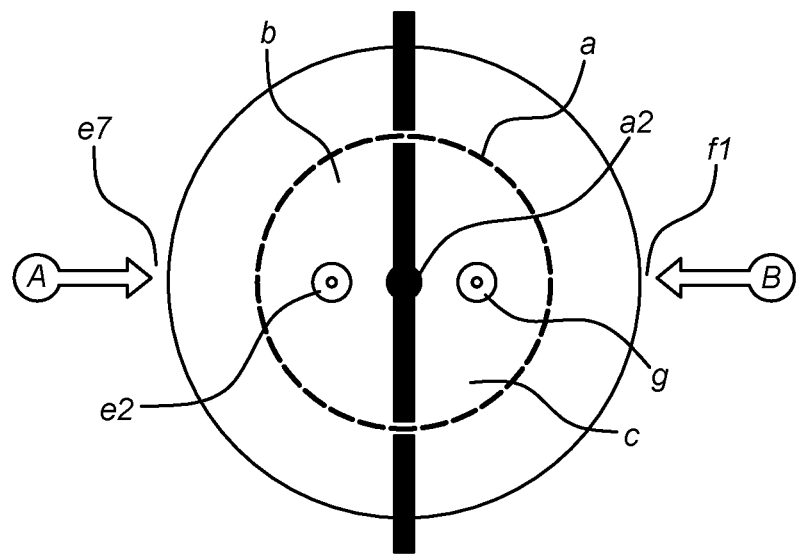

depleted in $CO_2$ located on the other end of the membrane in the sorption chamber, wherein the device is configured to allow air to flow from the inlet to the outlet through the membrane; (f) means for flowing stripping gas through the membrane into the regeneration chamber; (g) at least one outlet for discharging $CO_2$, located in the regeneration chamber; and (h) heating means for heating the regeneration chamber. The device according to the invention provides an efficient and low-cost solution for capturing $CO_2$ directly from air.

20 Claims, 3 Drawing Sheets

(51) Int. Cl.
    *B01D 69/02*      (2006.01)
    *B01D 69/12*      (2006.01)

(52) U.S. Cl.
    CPC .... *B01D 69/1216* (2022.08); *B01D 2253/112* (2013.01); *B01D 2253/20* (2013.01); *B01D 2253/204* (2013.01); *B01D 2253/25* (2013.01); *B01D 2253/304* (2013.01); *B01D 2257/504* (2013.01); *B01D 2259/4009* (2013.01); *B01D 2325/12* (2013.01)

(56) References Cited

U.S. PATENT DOCUMENTS

| | | | | |
|---|---|---|---|---|
| 11,007,473 B2* | 5/2021 | Ritter | .................. | B01D 53/047 |
| 11,266,943 B1* | 3/2022 | Stark, Jr. | ............ | B01D 53/0446 |
| 12,172,123 B2* | 12/2024 | Eisenberger | ........... | B01D 53/62 |
| 2009/0294366 A1* | 12/2009 | Wright | ............... | B01D 53/1418 |
| | | | | 210/683 |
| 2015/0007725 A1* | 1/2015 | Elliott | ..................... | B01D 53/83 |
| | | | | 96/125 |
| 2015/0273385 A1* | 10/2015 | Eisenberger | ........... | B01D 53/08 |
| | | | | 95/107 |
| 2021/0354085 A1* | 11/2021 | Khiavi | .................... | B01D 53/02 |
| 2022/0072471 A1* | 3/2022 | de Neve | ................ | B01D 53/06 |
| 2023/0264137 A1* | 8/2023 | De Neve | ............ | B01J 20/28045 |
| | | | | 95/139 |

FOREIGN PATENT DOCUMENTS

| | | | | |
|---|---|---|---|---|
| FR | 2826877 | | 1/2003 | |
| FR | 2826877 A1 * | | 1/2003 | ............. B01D 53/06 |
| JP | 2008212844 | | 9/2008 | |
| RU | 2021124214 A * | | 2/2023 | |
| WO | 2011/137398 | | 11/2011 | |
| WO | 2015/006259 | | 1/2015 | |
| WO | WO-2015006259 A1 * | | 1/2015 | ............. B01D 53/06 |
| WO | 2015/080998 | | 6/2015 | |
| WO | 2015/103401 | | 7/2015 | |
| WO | WO-2015103401 A1 * | | 7/2015 | ............. B01D 53/06 |

OTHER PUBLICATIONS

Sanz-Pérez et al.: "Direct Capture of CO2 from Ambient Air", Chemical Reviews, vol. 116, No. 19, (2016), pp. 11840-11876.

APS Physics: "Direct Air Capture of CO2 with Chemicals", Jun. 1, 2011.

Zhang et al.: "Capturing CO2 from ambient air using a polyethyleneimine-silica adsorbent in fluidized beds", Chemical Engineering Science, vol. 116 (2014), pp. 306-316.

* cited by examiner

DIRECT CARBON DIOXIDE CAPTURE FROM AIR

FIELD OF THE INVENTION

The present invention is in the field of carbon dioxide capture, in particular directly from air. The invention concerns a device and a process for the capture of carbon dioxide from air.

BACKGROUND ART

Recently, the desire to reduce the carbon dioxide footprint of mankind has led to the development of many process wherein $CO_2$, the major greenhouse gas accounting for global warming, is used as feedstock for useful products. Ironically, these emerging technologies are hampered by the limited availability of $CO_2$. Processes to capture $CO_2$ from gases rich in $CO_2$, such as industrial flue gases, have been developed, but cannot account for the demand for $CO_2$. Furthermore, such processes may lower the emission of $CO_2$ into the environment, the concentration of $CO_2$ already present in the environment is not affected. Hence, there is a need for capturing $CO_2$ directly from air, which would lower the $CO_2$ concentration in the environment and provide a further renewable source of $CO_2$.

Current known devices and processes for capturing $CO_2$ from air have very low efficiency, which is in view of the low $CO_2$ concentrations in air highly detrimental to the economic viability of such a process. An overview of existing processes is provided in *Direct air capture of $CO_2$ with chemicals—A technology assessment for the APS panel on public affairs*, Jun. 1, 2011, APS Physics (https://www.aps.org/policy/reports/assessments/upload/dac2011.pdf) and Sanz-Pérez et al., *Chem. Rev.* 2016, 116, 11840-11876.

Carbon Engineering developed a system wherein $CO_2$ sorbent is dissolved in an aqueous thin film. Air passes through the film (thickness 50 μm), after which it is transferred to a regeneration unit, where $CO_2$ is desorbed from the sorbent in solution. The thin films ensures that only small pressure differences are needed to enable contact of the air with the $CO_2$ sorbent. However, the big downside of this system is the energy intensive regeneration of the dissolved sorbent. High temperatures are required, which leads to high operation costs.

Also known are fluidized bed reactors, see e.g. Zhang et al., *Chemical Engineering Science*, 2014, 116, page 306-316. Air is blown through a bed containing porous particles wherein the pores have been coated with $CO_2$ sorbent. Since air will more easily pass between the particles than through the interior of the particles, the effective contact time between air and sorbent is much lower than the actual residence time of the air in the bed. In order to ensure sufficient contact time between air and $CO_2$ sorbent, a bed height of about 7 meters is typically required, meaning that effort is needed to force the air through this large column, i.e. a high pressure difference to allow air to pass through the column, which is energy intensive.

Also known is the Veloxotherm system, which is not for capturing $CO_2$ from air but from flue gases, which have increased $CO_2$ content. This system contains a rotating disk (thickness 40 cm) of solid $CO_2$ content. At one point, the $CO_2$-rich gas flows through the disk, where $CO_2$ is adsorbed and gas depleted in $CO_2$ is emitted to the environment. The loaded sorbent rotates away to a different point where stripping gas (steam) flows through the disk. A mixture of $CO_2$ and steam is obtained.

FR 2826877 relates to an apparatus for adsorbing molecules transported in ambient air, comprising a hollow cylindrical drum that rotates about its axis and has a peripheral wall made of two concentric perforated metal sheets (22, 23) enclosing a layer of adsorbent (24). The apparatus may be used for dehumidifying or purifying air. The adsorbent material may comprise silica, activated carbon or zeolites.

WO 2015/103401 describes a system for removing carbon dioxide from a gas mixture, the system comprising two groups of carbon dioxide removal structures, each removal structure within each group comprising a porous solid substrate supported on the structure, each porous substrate having a sorbent supported upon its surfaces, the sorbent being capable of adsorbing or binding to carbon dioxide, to remove carbon dioxide from a gas mixture.

WO 2015/006259 describes a process for separating $CO_2$ from a gas stream, comprising passing the gas stream over a sorbent that adsorbs the $CO_2$ and recovering the $CO_2$ by concentration swing adsorption and adsorptive displacement. The process does not rely on a temperature swing adsorption. The sorbent may comprise an alkalized substrate.

The present invention provides in the need for an efficient and economically viable device for capturing $CO_2$ directly from air, which avoids the large pressure differences of a fluidized bed reactor and the energy consuming regeneration of loaded sorbent dissolved in water. The advantages of the low pressure differences of a thin film are combined with the advantages of a solid state sorbent which requires less energy for regeneration. Thus, the present invention provides an energy-efficient solution for capturing $CO_2$ directly from air.

SUMMARY OF THE INVENTION

The inventors have developed a device and a process for the capture of $CO_2$ directly from air. The invention can be defined according to the following list of preferred embodiments:

1. Use of a membrane composed of a macroporous layer, wherein the pores of the macroporous layer are coated with a solid state $CO_2$ sorbent, for capturing $CO_2$ from air.
2. Use according to embodiment 1, wherein the membrane comprises a stack of thin films containing holes having a diameter in the range of 50-500 μm diameter, and each thin film is coated with a macroporous material containing the sorbent.
3. Use according to embodiment 1 or 2, wherein the use involves a flow of air through the membrane, preferably perpendicular to the membrane.
4. A device for capturing $CO_2$ from air, comprising:
   (a) a membrane at least partly permeable for air, composed of a macroporous layer, wherein the pores of the macroporous layer are coated with a solid state $CO_2$ sorbent;
   (b) at least one sorption chamber;
   (c) at least one regeneration chamber;
   (d) means for transporting the membrane from the sorption chamber to the regeneration chamber and back;
   (e) an inlet for receiving air located on one side of the membrane and an outlet for discharging air depleted in $CO_2$ located on the other side of the membrane in the sorption chamber, wherein the device is configured to allow air to flow from the inlet to the outlet through the membrane;
(f) means for flowing stripping gas through the membrane into the regeneration chamber;
(g) at least one outlet for discharging $CO_2$, located in the regeneration chamber; and
(h) heating means for heating the regeneration chamber.

5. Use device according to embodiment 4, wherein the membrane comprises a stack of thin films containing holes having a diameter in the range of 50-500 μm diameter, and each thin film is coated with a macroporous material containing the sorbent.

6. The device according to embodiment 4 or 5, wherein the membrane has the form of a loop, preferably a cylinder or a conveyer belt.

7. The device according to any one of embodiments 4-6, wherein the device further comprises:
(a) a cylinder comprising the membrane in the shape of a circumferential wall centred around a vertical central axis;
wherein means (d) are for rotating the cylinder around the vertical axis, and wherein the sorption chamber(s) are delimited by part of the circumferential wall and a dividing wall; wherein the regeneration chamber(s) are delimited by another part of the circumferential wall and a dividing wall.

8. The device according to any one of embodiments 4-6, wherein the device further comprises:
(a) a belt comprising the membrane as a separate layer;
wherein means (d) are for conveying the belt through the sorption and regeneration chamber(s); and wherein the sorption chamber(s) are delimited by part of the membrane and a dividing wall, wherein the regeneration chamber(s) are delimited by another part of the membrane and a dividing wall.

9. The device according to any one of embodiments 4-8, wherein the membrane is composed of a microporous backing layer and a macroporous top layer, wherein the pores of the macroporous top layer are coated with a solid state $CO_2$ sorbent.

10. The device according to any one of embodiments 4-9, further comprising a $CO_2$ recycle (j) that is configured to flow stripping gas through the membrane into the regeneration chamber (c), wherein the recycle comprises means to separate a product $CO_2$ flow from the recycle flow, wherein the product $CO_2$ flow is capable of being discharged by the outlet (g) for discharging $CO_2$ and the recycle flow is returned to the regeneration chamber (c).

11. The device according to any of embodiments 4-10, wherein heating means (h) are capable of heating the solid state $CO_2$ sorbent when positioned adjacent to or within the regeneration chamber to a temperature in the range of 50-100° C., preferably 60-85° C., most preferably 67-75° C.

12. The device according to any one of embodiments 4-11, wherein the heating means are capable of heating the stripping gas that flows through the membrane into the regeneration chamber.

13. The device according to any one of embodiments 4-12, which comprises 1-20 sorption chambers and 1-20 regeneration chambers.

14. The device according to any one of embodiments 4-13, wherein the $CO_2$ sorbent is selected from the group consisting of bicarbonate-based sorbents, amine-based sorbents and metal-organic frameworks.

15. The device according to any one of embodiments 4-14, wherein the junction between sorption and regeneration chambers is air tight.

16. The device according to any one of embodiments 4-15, wherein the heating means (h) is capable of heating the regeneration chamber to a temperature above the temperature of the sorption chamber.

17. A process for capturing $CO_2$ from air, comprising:
(i) moving a membrane composed of a macroporous layer, wherein the pores of the macroporous layer are coated with a solid state $CO_2$ sorbent, from a sorption section to a regeneration section;
(ii) providing a flow of air through the membrane at the sorption section, to obtain air depleted in $CO_2$ and loaded solid state $CO_2$ sorbent;
(iii) providing a flow of stripping gas through the membrane at the regeneration section, at elevated temperature, to obtain a product flow comprising $CO_2$ and regenerated solid state $CO_2$ sorbent;
wherein sorption of $CO_2$ by the solid state $CO_2$ sorbent occurs at the sorption section to obtain a loaded sorbent, and regeneration of the loaded sorbent occurs at the regeneration section to obtain regenerated solid state $CO_2$ sorbent.

18. The process according to embodiment 17, wherein the moving of step (i) involves rotating a cylinder having a circumferential wall around a central vertical axis, wherein the circumferential wall comprises the membrane.

19. The process according to embodiment 17, wherein the moving of step (i) involves conveying a belt through the sorption and regeneration chambers, wherein the belt comprises the membrane.

20. The process according to any one of embodiments 17-19, wherein the stripping gas is provided by a recycle from the product flow, wherein the product flow comprising $CO_2$ obtained in (ii) is separated into a product $CO_2$ flow and a recycle flow comprising stripping gas, and the recycle flow is recycled to (ii).

21. The process according to any one of embodiments 17-20, further comprising:
(iv) heating the stripping gas to the elevated temperature prior to being passed through the membrane during (ii).

22. The process according to any one of embodiments 17-21, being performed using the device according to any one of embodiments 4-15.

23. Use of a membrane composed of a macroporous layer, wherein the pores of the macroporous layer are coated with a solid state sorbent, for capturing a gaseous species from air, wherein the sorbent is selective for the gaseous species.

24. The use according to embodiment 23, wherein the gaseous species is selected from carbon oxides, sulphur oxides and nitrogen oxides, preferably $SO_x$ and/or $NO_x$.

25. The use according to embodiment 23 or 24, wherein the membrane is embedded in the device according to any one of embodiments 4-16.

In an alternative aspect, the invention can be defined according to the following list of preferred embodiments:
1. A device for capturing $CO_2$ from air, comprising:
(a) a cylinder having a circumferential wall centred around a vertical central axis, wherein the circumferential wall is at least partly permeable for air and comprises a solid state $CO_2$ sorbent;

(b) means for rotating the cylinder around the vertical axis;

(c) at least one sorption chamber delimited by part of the circumferential wall and a dividing wall;

(d) at least one regeneration chamber delimited by another part of the circumferential wall and a dividing wall;

(e) an inlet for receiving air located on one end of the circumferential wall and an outlet for discharging air depleted in $CO_2$ located on the other end of the circumferential wall in the sorption chamber, wherein the device is configured to allow air to flow from the inlet to the outlet though the circumferential wall;

(f) means for flowing stripping gas through the circumferential wall into the regeneration chamber;

(g) at least one outlet for discharging $CO_2$, located in the regeneration chamber; and (h) heating means for heating the regeneration chamber.

2. The device according to embodiment 1, wherein the circumferential wall is composed of a microporous backing layer and a macroporous top layer, wherein the pores of the macroporous top layer are coated with a solid state $CO_2$ sorbent.

3. The device according to embodiment 1 or 2, further comprising a $CO_2$ recycle (i) that is configured to flow stripping gas through the circumferential wall into the regeneration chamber (d), wherein the recycle comprises means to separate a product $CO_2$ flow from the recycle flow, wherein the product $CO_2$ flow is capable of being discharged by the outlet (g) for discharging $CO_2$ and the recycle flow is returned to the regeneration chamber (d).

4. The device according to any of the preceding embodiments, wherein heating means (h) are capable of heating the solid state $CO_2$ sorbent when positioned adjacent to or within the regeneration chamber to a temperature in the range of 50-100° C., preferably 60-85° C., most preferably 67-75° C.

5. The device according to any of the preceding embodiments, wherein the heating means are capable of heating the stripping gas that flows through the circumferential wall into the regeneration chamber.

6. The device according to any of the preceding embodiments, which comprises 1-20 sorption chambers and 1-20 regeneration chambers, wherein the sorption chambers and the regeneration chambers are positioned alternatingly within the cylinder.

7. The device according to any of the preceding embodiments, wherein the $CO_2$ sorbent is selected from the group consisting of bicarbonate-based sorbents, amine-based sorbents and metal-organic frameworks.

8. A process for capturing $CO_2$ from air, comprising (iv) rotating a cylinder having a circumferential wall around a central vertical axis, wherein the circumferential wall is at least partly permeable for air and comprises a solid state $CO_2$ sorbent;

(v) providing a flow of air through the circumferential wall at a sorption section, to obtain air depleted in $CO_2$ and loaded solid state $CO_2$ sorbent;

(vi) providing a flow of stripping gas through the circumferential wall at a regeneration section, at elevated temperature, to obtain a product flow comprising $CO_2$ and regenerated solid state $CO_2$ sorbent; wherein at the sorption section sorption of $CO_2$ by the solid state $CO_2$ sorbent occurs to obtain a loaded sorbent and at the regeneration section regeneration of the loaded sorbent occurs to obtain regenerated solid state $CO_2$ sorbent.

9. The process according to embodiment 8, wherein the stripping gas is provided by a recycle from the product flow, wherein the product flow comprising $CO_2$ obtained in (iii) is separated into a product $CO_2$ flow and a recycle flow comprising stripping gas, and the recycle flow is recycled to (iii).

10. The process according to embodiment 8 or 9, further comprising:

(iv) heating the stripping gas to the elevated temperature prior to being passed through the circumferential wall during (iii).

11. The process according to any one of embodiments 8-10, which is performed using the device according to any one of embodiments 1-7.

DETAILED DESCRIPTION

The present invention provides a device and a process for capturing $CO_2$ directly from air. The device according to the invention is intended to be used with the process according to the invention. Likewise, the process according to the invention is intended to be performed in the device according to the invention. The device and process according employ a membrane composed of a macroporous layer, wherein the pores of the macroporous layer are coated with a solid state $CO_2$ sorbent. Hence, the invention also concerns the use of such a membrane for capturing $CO_2$ from air. Anything disclosed herein for the process according to the invention equally applies to the device according to the invention and the use according to the invention, and anything disclosed herein for the device according to the invention equally applies to the process according to the invention and the use according to the invention.

The invention further concerns the use of a membrane composed of a macroporous layer, wherein the pores of the macroporous layer are coated with a solid state sorbent for capturing gaseous species from air, other than carbon dioxide.

The Device

The device for capturing $CO_2$ from air according to the invention comprises:

(a) a membrane at least partly permeable for air, comprising a solid state $CO_2$ sorbent coated in the pores of the membrane;

(b) at least one sorption chamber;

(c) at least one regeneration chamber;

(d) means for transporting the membrane from the sorption chamber to the regeneration chamber and back;

(e) an inlet for receiving air located on one side of the membrane and an outlet for discharging air depleted in $CO_2$ located on the other side of the membrane in the sorption chamber, wherein the device is configured to allow air to flow from the inlet to the outlet through the membrane;

(f) means for flowing stripping gas through the membrane into the regeneration chamber;

(g) at least one outlet for discharging $CO_2$, located in the regeneration chamber; and (h) heating means for heating the regeneration chamber.

The "device" may also be referred to as a "system" or an "apparatus". The core of the device according to the invention is a membrane composed of a macroporous layer, wherein the pores of the macroporous are coated with a solid state $CO_2$ sorbent. Gases such as air and $CO_2$ are capable of flowing through the membrane, and while other gaseous species will permeate the membrane, $CO_2$ molecules will be absorbed by the sorbent. The membrane typically has the form of a loop, preferably of a cylinder or a conveyer belt.

Solid state $CO_2$ sorbents are known in the art. Any material that is capable to adsorb $CO_2$ molecules at room temperature is suitable as solid state $CO_2$ sorbent. The sorbent may also be referred to as an adsorbent. The sorbent is capable of releasing the adsorbed molecules of $CO_2$ at elevated temperature, preferably in the range of 50-100° C., preferably in the range of 60-85° C., most preferably in the range of 67-75° C. The skilled person finds further guidance in selecting a suitable sorbent in Sanz-Pérez et al., Chem. Rev. 2016, 116, 11840-11876, which is incorporated by reference herein. Preferably, the sorbent is amine-based and/or bicarbonate-based. Such sorbents are known in the art, and include polyethylene imine (PEI) and potassium bicarbonate ($KHCO_3$). Also metal-organic frameworks (MOFs) are suitable sorbents for $CO_2$.

The membrane is porous, to enable the flow of gas through the membrane. In the context of the present invention, the membrane may also be referred to as "thin layer". Suitable membranes to be used in the present invention can be prepared in any way known in the art, for example by growing the macroporous layer on a backing layer, such as a microporous layer or another porous layer. A suitable technique is plasma-enhanced chemical vapour deposition (PEVCD), see e.g. WO 2016/163878. In a preferred embodiment, the average pore size is in the range of 5-250 nm, more preferably in the range of 10-50 nm. The membrane typically comprises an inert porous material, such as amorphous silicon, onto which the sorbent is coated. As such, a thin film is formed, through which air can flow with minimal pressure difference over the membrane. In a preferred embodiment, the macroporous layer is deposited onto or coated onto a backing layer. In one embodiment, the backing layer is a porous layer comprising small holes, e.g. having a diameter in the range of 50-500 μm, preferably in the range of 100-250 μm. In an alternative embodiment, the membrane is composed of a microporous backing layer and a macroporous top layer, wherein the pores of the macroporous top layer are coated with a solid state $CO_2$ sorbent. The backing serves as a support for the macroporous top layer, which can be grown on top of the backing layer. The backing layer is preferably formed by an inert metal mesh, such as a mesh from copper wire.

Preferably, the total thickness of the thin layer is in the range of 10-250 μm, more preferably in the range of 15-100 μm, most preferably in the range of 20-50 μm. Such thicknesses of the thin layer allow efficient passage of gases (air during sorption, $CO_2$ during regeneration) with a minimal pressure drop over the membrane, while still affording efficient sorption of the $CO_2$ molecules comprised in the air onto the sorbent. An additional advantage of the thin layer is that it can be heated and cooled in a relatively short amount of time, which allows for a quick adsorption and regeneration cycle. In case a backing layer is present, it is preferably very thin, such as in the range of 1-25 μm, preferably in the range of 5-15 μm. The top layer may be somewhat thicker, such as in the range of 5-200 μm, preferably in the range of 10-75 μm, most preferably in the range of 20-50 μm.

The arrangement of the solid state $CO_2$ sorbent into a thin layer forces the air to pass through the coated pores of the thin layer, as such maximizing the interaction between $CO_2$ molecules comprised in air and the sorbent. This offers a significant advantage over beds of granular sorbents (a fluidized bed reactor), through which the air can flow without contacting the sorbent, as such reducing the interaction and lowering the sorption efficiency. Furthermore, flowing air through a bed of granular sorbent requires much more energy, typically in the form of a pressure difference between the inlet side of the bed and the outlet side of the bed.

Although the thin layer requires only minimal pressure drop over the membrane, it is preferred that the device further comprises means to facilitate the flow of air through the membrane. Such a means may for example take the form of a decompressor which can reduce the pressure within the membrane (e.g. the space confined within the cylinder or belt) on the permeate side of the membrane, i.e. within the sorption chamber and preferably also within the regeneration chamber.

The thin layer may be positioned onto a supporting layer having large holes in the side wall, e.g. a mechanical device such as a rotating drum. Such a supporting layer may be manufactured from stainless steel and/or may have holes having a diameter in the range of 0.1-50 mm, such as 0.5-20 mm. Multiple thin layers on top of each other. As such, the air is forced through multiple layers, increasing the capacity if the membrane. The inventors have found that this can be achieved without jeopardizing the low pressure drop needed to achieve membrane permeation. Each of the layers may contain a backing layer and a top layer as defined herein. Preferably 1-5 thin layers are positioned as such, more preferably 1 or 2 layers are present. The size of the membrane is not crucial for operating the present invention, and may range from a centimetre for small-scale devices to many meters for large scale industrial devices. For example, for the diameter of a cylindrical membrane may range from 0.5 cm to 100 m, preferably 1 cm to 10 m, more preferably 5 cm to 5 m. The height of the membrane is also not crucial for the present invention, and may range from a millimetre to many meters. For example, the height may range from 0.1 cm to 25 m, preferably 0.5 cm to 10 m. These parameters are fully adjustable depending on the desired size of the device and scale of the $CO_2$ capture process.

The device according to the invention comprises means for transporting or moving the membrane through various zones. The membrane typically takes the form of a closed loop, which continuously revolves as the device is in use. As the membrane moves, it follows the trajectory of the loop. Located on the trajectory of the loop are various zones, comprising at least one sorption chamber and at least one regeneration chamber, as defined further below. In one embodiment, further detailed below, the membrane loop has the form of a cylinder, wherein the membrane is located on the circumferential wall, which may rotate to transport the membrane from one zone to the next. In another embodiment, further detailed below, the membrane loop has the form of a belt, much like a conveying belt, which moves from one zone to another.

Upon moving, the membrane passes through at least two chambers, one sorption chamber and one regeneration chamber. More than one of each type of chamber may be present, such as 1-20 sorption chambers and 1-20 regeneration chambers. Typically, the amount of sorption chambers and the amount of regeneration chambers is the same. In a preferred embodiment, the sorption chambers and the regeneration chambers are positioned alternatingly around the trajectory of the membrane loop, such that when the membrane is transported, it passes through alternating sorption chambers and the regeneration chambers. In an especially preferred embodiment, there is one sorption chamber and one regeneration chamber.

The sorption chambers and the regeneration chambers are zones through which the membrane passes. The chambers are delimited by dividing walls, which divides the volume around the moving membrane into a plurality of chambers or zones. The dividing walls should allow passage of the membrane upon passage thereof. Typically, the segments of the dividing wall extend beyond the membrane and contain an opening through which the membrane passes during moving thereof. Upon such passage, the connection between the moving membrane and the dividing wall is preferably substantially air-tight, to avoid leakage of gases between sorption chambers and regeneration chambers as much as possible. In a preferred embodiment, at least the leakage of $CO_2$ from the regeneration chamber to the sorption chamber is substantially avoided. More preferably, also the leakage of air from the sorption chamber to the regeneration chamber is also substantially avoided. Leakage of $CO_2$ to the sorption chamber would directly counteract the capture of $CO_2$ from air by the sorbent. On the other hand, leakage of air to the regeneration chamber would lead to contamination of the $CO_2$ flow, in particular the $CO_2$ product stream, which is disadvantageous for the present process but can be resolved by proper handling of the product stream.

It is thus preferred that the device according to the invention comprises means for substantially air-tight sealing of the sorption chambers and the regeneration chambers during passage of the membrane. Typically, such means are provided at the opening in the dividing wall that extends beyond the membrane, through which opening the membrane passes. Means for air-tight sealing are known in the art. In one embodiment, the air-tight sealing is accomplished by a gas curtain, preferably an active nitrogen curtain, wherein nitrogen is blown through the opening during rotation. Alternatively or additionally, the device is configured such that the regeneration chambers operate at (slightly) reduced pressure compared to the sorption rooms, such that any leakage of $CO_2$ from the regeneration chambers to the sorption chambers is avoided. Gas leakage between sorption and regeneration chambers can also be avoided by providing space between two adjacent chambers. Leakage of $CO_2$ from the regeneration would not contaminate the air depleted in $CO_2$ in the sorption chamber, but would end up in the open space between the chambers and can be separately collected if desired.

At the sorption chamber(s), sorption of $CO_2$ molecules onto the sorbent occurs. During operation, the conditions within the sorption chamber(s) should be favourable for $CO_2$ sorption. The optimal conditions for $CO_2$ sorption may vary from sorbent to sorbent, they typically include ambient pressure and temperature, although deviation thereof may occur without significantly jeopardizing the sorption efficiency of the device according to the invention. Thus, air enters through the inlet and is allowed to flow through the membrane into the sorption chamber. As sorption occurs during passage through the membrane, the air that enters the sorption chamber is depleted in $CO_2$. In other words, the $CO_2$ concentration in the air is reduced compared to the incoming air that is received via the inlet. The air depleted in $CO_2$ is discharged from the device according to the invention by the outlet. The outlet is positioned in the sorption chamber on the opposite side of the membrane compared to the inlet. Typically, the outlet is position in the top of the bottom of the sorption chamber, in order not to interfere with the moving membrane. In a preferred embodiment, the number of inlets for receiving air and the number of outlets for discharging air depleted in $CO_2$ are both equal to the number of sorption chambers.

At the regeneration chamber(s), regeneration of the loaded sorbent (i.e. loaded with $CO_2$ molecules) occurs. Regeneration or desorption occurs by passing a stripping gas through the loaded sorbent. Any known stripping gas for regenerating loaded solid state $CO_2$ sorbents may be used. The stripping gas preferably comprises one or more of $CO_2$, steam and inert gases such as nitrogen and helium. In one embodiment, the stripping gas is selected from the group consisting of nitrogen, steam, helium and $CO_2$, preferably from the group consisting of steam and $CO_2$. In the context of the present invention, the stripping gas preferably comprises $CO_2$, preferably comprises at least 80 vol % $CO_2$ based on total volume or even at least 95 vol % $CO_2$ based on total volume, most preferably the stripping gas consists substantially of $CO_2$, or in other words most preferably the stripping gas is $CO_2$. During operation, the conditions within the regeneration chamber(s) should be favourable for $CO_2$ desorption. The optimal conditions for $CO_2$ desorption may vary from sorbent to sorbent, they typically include ambient pressure and elevated temperature, although deviation thereof may occur without significantly jeopardizing the sorption efficiency of the device according to the invention. Optimal results are obtained with desorption at elevated temperature, such that the device according to the invention comprises heating means that are capable of heating the regeneration chamber, typically to a temperature in the range of 50-100° C., preferably in the range of 60-85° C., most preferably in the range of 67-75° C.

Thus, stripping gas enters via the inlet and is passed through the membrane into the regeneration chamber. As desorption occurs during passage of the membrane, the gas that enters the regeneration chamber is enriched in $CO_2$. In other words, the $CO_2$ content in the gas is increased compared to the incoming stripping gas. In case pure $CO_2$ is preferably used as stripping gas, the concentration of $CO_2$ therein typically remains the same (about 100 vol %), but the absolute amount of $CO_2$ molecules is increased in the gas that enters the regeneration chamber. A product stream comprising, typically consisting substantially of, $CO_2$ is discharged from the device according to the invention by the outlet.

Alternative stripping gases may also be used. For example, steam and inert gases such as helium and nitrogen, are known as efficient stripping gases. In that case, it is preferred that the device comprises means to separate the spent stripping gas comprising e.g. nitrogen and/or steam and desorbed $CO_2$ into a $CO_2$ stream and a stripping gas stream. Since $CO_2$ is capable of stripping a loaded $CO_2$ sorbent, incomplete separation such that some $CO_2$ remains in the stripping gas does not hamper the process. Processes to accomplish such separation are known in the art. For example, $CO_2$ may be removed from steam by condensation of the steam, after which the gaseous $CO_2$ is discharged as product flow and the steam may be reused as stripping gas after evaporation.

Preferably, a recycle is provided wherein stripping has is circulated through the device. This is especially advantageous in case the stripping gas consists substantially of $CO_2$. As such, the stripping gas after being used for regeneration still contains substantially only $CO_2$. This spend stripping gas is easily split into a recycle stream, which is reused for regeneration and a product stream which is discharged from the device. This product stream consist substantially of $CO_2$ which has been captured from air. Preferably, the size of the recycle is constant and sufficient to keep regenerating loaded sorbent, such that all $CO_2$ that is captured form air ends up in the product stream. This product stream then consists of $CO_2$ captured from air, which is the crucial product of the process according to the invention.

In a preferred embodiment, the heating means for heating the regeneration chamber are configured such that the stripping gas is heated prior to being passed through the loaded sorbent. The heated stripping gas will then ensure the proper conditions for desorption to occur. In case a $CO_2$ recycle is present, it is preferred that the heating occurs after splitting of the product stream, such that a smaller volume of gas needs to be heated.

In view of the low concentration of $CO_2$ in air, typically large amounts of air should be blown through the device according to the invention in order to achieve high yields of captured $CO_2$. To ensure that such large amounts of air are introduced into the device, it is preferably implemented in existing ventilation systems or at locations where flow of air is naturally present. This is for example the case in industrial processes wherein large temperature differences provide an air flow, such as large scale cooling processes.

In one embodiment, the device according to the invention further comprises a suction device for sucking air into the device, in particular into the sorption chamber. Such suction devices are known in the art and include for example a ventilator or fan. This suction device is arranged such that air is able to be sucked into the sorption chamber.

The advantages of the present invention are fully exploited in two preferred embodiments. The device according to the first preferred embodiment takes the form of a rotating cylinder, wherein the membrane takes the form of a cylindrical wall. The device according to the first preferred embodiment takes the form of a moving belt, wherein the membrane takes the form of a belt. The devices according to these two embodiments are described in more detail here below.

The device having the form of a rotating cylinder comprises:
 (a) a cylinder having a circumferential wall centred around a vertical central axis, wherein the circumferential wall is at least partly permeable for air and comprises a solid state $CO_2$ sorbent;
 (b) at least one sorption chamber delimited by part of the circumferential wall and a dividing wall;
 (c) at least one regeneration chamber delimited by another part of the circumferential wall and a dividing wall;
 (d) means for rotating the cylinder around the vertical axis;
 (e) an inlet for receiving air located on one end of the circumferential wall and an outlet for discharging air depleted in $CO_2$ located on the other end of the circumferential wall in the sorption chamber, wherein the device is configured to allow air to flow from the inlet to the outlet though the circumferential wall;
 (f) means for flowing stripping gas through the circumferential wall into the regeneration chamber;
 (g) at least one outlet for discharging $CO_2$, located in the regeneration chamber; and
 (h) heating means for heating the regeneration chamber.

The core of the rotating cylinder device is a cylinder having a circumferential wall centred around a vertical axis. The circumferential wall of the cylinder comprises a solid state $CO_2$ sorbent. Gases such as air and $CO_2$ are capable of flowing through the circumferential wall. All defined above for the membrane applies to the cylindrical wall. The circumferential wall is porous, to enable the flow of gas through the wall. In a preferred embodiment, the average pore size is in the range of 5-250 nm, more preferably in the range of 10-50 nm.

The thin layer may be positioned onto a mechanical device such as a rotating drum having large holes in the side wall. Such a drum may be manufactured from stainless steel and/or may have holes having a diameter in the range of 0.1-50 mm, such as 0.5-20 mm. Multiple thin layers, each containing a backing layer and a top layer as defined herein, may be positioned on the rotating drum. Preferably 1-5 thin layers are positioned as such, more preferably 1 or 2 layers are present. To increase the area of contact with the air, it is preferred that the thin layer(s) are positioned on the outside of the rotating drum. The diameter of the circumferential wall is not crucial for operating the present invention, and may range from a centimetre for small-scale devices to many meters for large scale industrial devices. For example, the diameter may range from 0.5 cm to 100 m, preferably 1 cm to 10 m, more preferably 5 cm to 5 m. The height of the cylinder, i.e. of the circumferential wall is also not crucial for the present invention, and may range from a millimetre to many meters. For example, the height may range from 0.1 cm to 25 m, preferably 0.5 cm to 10 m. These parameters are fully adjustable depending on the desired size of the device and scale of the $CO_2$ capture process.

The circumferential wall of the cylinder is centred around a vertical axis, around which it can rotate. The central axis is thus located at the midpoint of the circle formed by the circumferential wall. The device according to the invention comprises means for rotating the cylinder around this vertical axis. Such means are well-known in the art.

Upon rotating, the circumferential wall passes through at least two chambers, one sorption chamber and one regeneration chamber. More than one of each type of chamber may be present, such as 1-20 sorption chambers and 1-20 regeneration chambers. Typically, the amount of sorption chambers and the amount of regeneration chambers is the same. In a preferred embodiment, the sorption chambers and the regeneration chambers are positioned alternatingly within the circumferential wall, such that when the circumferential wall rotates, it passes through alternating sorption chambers and the regeneration chambers. In an especially preferred embodiment, there is one sorption chamber and one regeneration chamber.

The sorption chambers and the regeneration chambers are located within the cylinder, and are each delimited by the circumferential wall and a dividing wall, which divides the inner space of the cylinder into a plurality of chambers. Typically, the dividing wall has a plurality of segments radially extending from the central axis towards the circumferential wall, as such forming wedge-shaped chambers. Although the apex of each of the wedge-shaped chambers, located at the centre of the cylinder where the segments of the dividing wall connect (i.e. the angle at which two segments of the dividing wall are connected), may differ, it is preferred that the apex of all sorption chambers is equal and the apex of all regeneration chambers is equal. Most preferably, the apex of all chambers is equal. In an especially preferred embodiment, there is one sorption chamber and one regeneration chamber, and the apex of each chamber is about 180°. An adjacent pair of a sorption and a regeneration chamber may share a common dividing wall, but there may also be a space present between the dividing wall that delimits the sorption chamber and the dividing wall that delimits the regeneration chamber.

The dividing wall should allow passage of the circumferential wall upon rotating thereof. Typically, the segments of the dividing wall extend beyond the circumferential wall and contain an opening through which the circumferential wall may pass during rotation thereof. Upon such passage, the connection between the moving circumferential wall and the dividing wall is preferably substantially air-tight, to avoid leakage of gases between sorption chambers and regeneration chambers as much as possible. In a preferred embodiment, at least the leakage of $CO_2$ from the regeneration chamber to the sorption chamber is substantially avoided. More preferably, also the leakage of air from the sorption chamber to the regeneration chamber is also substantially avoided. Leakage of $CO_2$ to the sorption chamber would directly counteract the capture of $CO_2$ from air by the sorbent. On the other hand, leakage of air to the regeneration chamber would lead to contamination of the $CO_2$ flow, in particular the $CO_2$ product stream, which is disadvantageous for the present process but can be resolved by proper handling of the product stream.

It is thus preferred that the device according to the invention comprises means for substantially air-tight sealing of the sorption chambers and the regeneration chambers during rotation of the circumferential wall. Typically, such means are provided at the opening in the dividing wall that extends beyond the circumferential wall, through which opening the circumferential wall moves during rotation. Means for air-tight sealing are known in the art. In one embodiment, the air-tight sealing is accomplished by a gas curtain, preferably an active nitrogen curtain, wherein nitrogen is blown through the opening during rotation. Alternatively or additionally, the device is configured such that the regeneration chambers operate at (slightly) reduced pressure compared to the sorption rooms, such that any leakage of $CO_2$ from the regeneration chambers to the sorption chambers is avoided. Gas leakage between sorption and regeneration chambers can also be avoided by providing space between two adjacent chambers. Leakage of $CO_2$ from the regeneration would not contaminate the air depleted in $CO_2$ in the sorption chamber, but would end up in the open space between the chambers and can be separately collected if desired.

At the sorption chamber(s), sorption of $CO_2$ molecules onto the sorbent occurs. During operation, the conditions within the sorption chamber(s) should be favourable for $CO_2$ sorption. The optimal conditions for $CO_2$ sorption may vary from sorbent to sorbent, they typically include ambient pressure and temperature, although deviation thereof may occur without significantly jeopardizing the sorption efficiency of the device according to the invention. Thus, air enters through the inlet and is allowed to flow through the circumferential wall into the sorption chamber. As sorption occurs during passage through the circumferential wall, the air that enters the sorption chamber is depleted in $CO_2$. In other words, the $CO_2$ concentration in the air is reduced compared to the incoming air that is received via the inlet. The air depleted in $CO_2$ is discharged from the device according to the invention by the outlet. The outlet is positioned in the sorption chamber on the opposite side of the circumferential wall compared to the inlet. Typically, the outlet is position in the top of the bottom of the sorption chamber, in order not to interfere with the rotating circumferential wall. In a preferred embodiment, the number of inlets for receiving air and the number of outlets for discharging air depleted in $CO_2$ are both equal to the number of sorption chambers.

At the regeneration chamber(s), regeneration of the loaded sorbent (i.e. loaded with $CO_2$ molecules) occurs. Regeneration or desorption occurs by passing a stripping gas through the loaded sorbent. Any known stripping gas for regenerating loaded solid state $CO_2$ sorbents may be used. The stripping gas preferably comprises one or more of $CO_2$, steam and inert gases such as nitrogen and helium. In one embodiment, the stripping gas is selected from the group consisting of nitrogen, steam, helium and $CO_2$, preferably from the group consisting of steam and $CO_2$. In the context of the present invention, the stripping gas preferably comprises $CO_2$, preferably comprises at least 80 vol % $CO_2$ based on total volume or even at least 95 vol % $CO_2$ based on total volume, most preferably the stripping gas consists substantially of $CO_2$, or in other words most preferably the stripping gas is $CO_2$. During operation, the conditions within the regeneration chamber(s) should be favourable for $CO_2$ desorption. The optimal conditions for $CO_2$ desorption may vary from sorbent to sorbent, they typically include ambient pressure and elevated temperature, although deviation thereof may occur without significantly jeopardizing the sorption efficiency of the device according to the invention. Optimal results are obtained with desorption at elevated temperature, such that the device according to the invention comprises heating means that are capable of heating the regeneration chamber, typically to a temperature in the range of 50-100° C., preferably in the range of 60-85° C., most preferably in the range of 67-75° C.

Thus, stripping gas enters is passed through the circumferential wall into the regeneration chamber. As desorption occurs during passage through the circumferential wall, the gas that enters the regeneration chamber is enriched in $CO_2$. In other words, the $CO_2$ content in the gas is increased compared to the incoming stripping gas. In case pure $CO_2$ is preferably used as stripping gas, the concentration of $CO_2$ therein typically remains the same (about 100 vol %), but the absolute amount of $CO_2$ molecules is increased in the gas that enters the regeneration chamber. A product stream comprising, typically consisting substantially of, $CO_2$ is discharged from the device according to the invention by the outlet.

The device having the form of a moving belt comprises:
(a) a belt comprising the membrane as a separate layer, wherein the membrane is at least partly permeable for air and comprises a solid state CO2 sorbent;
(b) at least one sorption chamber;
(c) at least one regeneration chamber;
(d) means for conveying the belt through the sorption and regeneration chamber(s);
(e) an inlet for receiving air located on one side of the membrane and an outlet for discharging air depleted in $CO_2$ located on the other side of the membrane in the sorption chamber, wherein the device is configured to allow air to flow from the inlet to the outlet through the membrane;
(f) means for flowing stripping gas through the membrane into the regeneration chamber;
(g) at least one outlet for discharging $CO_2$, located in the regeneration chamber; and
(h) heating means for heating the regeneration chamber.

The device according to this preferred embodiment comprises the membrane positioned onto a mechanical device, a belt which is capable of moving around much like a conveyer belt. The belt comprises the membrane as a separate layer. The membrane is positioned onto a supporting layer, wherein the pores of the macroporous layer comprises the solid state $CO_2$ sorbent coated within the pores. Gases such as air and $CO_2$ are capable of flowing through the belt. All defined above for the membrane applies to the belt of this embodiment. In a preferred embodiment, the average pore size of the membrane is in the range of 5-250 nm, more preferably in the range of 10-50 nm.

The supporting layer of the belt, onto which the membrane is positioned may be manufactured from stainless steel and/or may have holes having a diameter in the range of 0.1-50 mm, such as 0.5-20 mm. Multiple thin layers, each containing a backing layer and a top layer as defined herein, may be positioned on the belt. Preferably 1-5 thin layers are positioned as such, more preferably 1 or 2 layers are present. To increase the area of contact with the air, it is preferred that the thin layer(s) are positioned on the outside of the belt. The diameter of the belt is not crucial for operating the present invention, and may range from a centimetre for small-scale devices to many meters for large scale industrial devices. For example, the diameter may range from 0.5 cm to 100 m, preferably 1 cm to 10 m, more preferably 5 cm to 5 m. The width of the belt, i.e. of the membrane, is also not crucial for the present invention, and may range from a millimetre to many meters. For example, the height may range from 0.1 cm to 25 m, preferably 0.5 cm to 10 m. These parameters are fully adjustable depending on the desired size of the device and scale of the $CO_2$ capture process.

The belt is able to move or convey. The device according to the invention comprises means for conveying the belt. Such means are well-known in the art. Upon being conveyed, the belt passes through at least two chambers, one sorption chamber and one regeneration chamber. More than one of each type of chamber may be present, such as 1-20 sorption chambers and 1-20 regeneration chambers. Typically, the amount of sorption chambers and the amount of regeneration chambers is the same. In a preferred embodiment, the sorption chambers and the regeneration chambers are positioned alternatingly around the belt, such that when the belt moves, it passes through alternating sorption chambers and the regeneration chambers. In an especially preferred embodiment, there is one sorption chamber and one regeneration chamber.

The sorption chambers and the regeneration chambers are located adjacent to the belt, and are each delimited by a part of the belt and a dividing wall, which divides the space around the belt into a plurality of chambers. These chambers may be positioned on the inside or the outside of the belt. An adjacent pair of a sorption and a regeneration chamber may share a common dividing wall, but there may also be a space present between the dividing wall that delimits the sorption chamber and the dividing wall that delimits the regeneration chamber.

The dividing wall should allow passage of the belt when it is being conveyed. Typically, the segments of the dividing wall extend beyond the belt and contain an opening through which the belt may pass during rotation thereof. Upon such passage, the connection between the moving belt and the dividing wall is preferably substantially air-tight, to avoid leakage of gases between sorption chambers and regeneration chambers as much as possible. In a preferred embodiment, at least the leakage of $CO_2$ from the regeneration chamber to the sorption chamber is substantially avoided. More preferably, also the leakage of air from the sorption chamber to the regeneration chamber is also substantially avoided. Leakage of $CO_2$ to the sorption chamber would directly counteract the capture of $CO_2$ from air by the sorbent. On the other hand, leakage of air to the regeneration chamber would lead to contamination of the $CO_2$ flow, in particular the $CO_2$ product stream, which is disadvantageous for the present process but can be resolved by proper handling of the product stream.

It is thus preferred that the device according to the invention comprises means for substantially air-tight sealing of the sorption chambers and the regeneration chambers during rotation of the belt. Typically, such means are provided at the opening in the dividing wall that extends beyond the belt, through which opening the belt moves during rotation. Means for air-tight sealing are known in the art. In one embodiment, the air-tight sealing is accomplished by a gas curtain, preferably an active nitrogen curtain, wherein nitrogen is blown through the opening during rotation. Alternatively or additionally, the device is configured such that the regeneration chambers operate at (slightly) reduced pressure compared to the sorption rooms, such that any leakage of $CO_2$ from the regeneration chambers to the sorption chambers is avoided. Gas leakage between sorption and regeneration chambers can also be avoided by providing space between two adjacent chambers. Leakage of $CO_2$ from the regeneration would not contaminate the air depleted in $CO_2$ in the sorption chamber, but would end up in the open space between the chambers and can be separately collected if desired.

At the sorption chamber(s), sorption of $CO_2$ molecules onto the sorbent occurs. During operation, the conditions within the sorption chamber(s) should be favourable for $CO_2$ sorption. The optimal conditions for $CO_2$ sorption may vary from sorbent to sorbent, they typically include ambient pressure and temperature, although deviation thereof may occur without significantly jeopardizing the sorption efficiency of the device according to the invention. Thus, air enters through the inlet and is allowed to flow through the membrane deposited onto the belt into the sorption chamber. As sorption occurs during passage through the belt, the air that enters the sorption chamber is depleted in $CO_2$. In other words, the $CO_2$ concentration in the air is reduced compared to the incoming air that is received via the inlet. The air depleted in $CO_2$ is discharged from the device according to the invention by the outlet. The outlet is positioned in the sorption chamber on the opposite side of the belt compared to the inlet. Typically, the outlet is position in the top of the bottom of the sorption chamber, in order not to interfere with the moving belt. In a preferred embodiment, the number of inlets for receiving air and the number of outlets for discharging air depleted in $CO_2$ are both equal to the number of sorption chambers.

At the regeneration chamber(s), regeneration of the loaded sorbent (i.e. loaded with $CO_2$ molecules) occurs. Regeneration or desorption occurs by passing a stripping gas through the loaded sorbent. Any known stripping gas for regenerating loaded solid state $CO_2$ sorbents may be used. The stripping gas preferably comprises one or more of $CO_2$, steam and inert gases such as nitrogen and helium. In one embodiment, the stripping gas is selected from the group consisting of nitrogen, steam, helium and $CO_2$, preferably from the group consisting of steam and $CO_2$. In the context of the present invention, the stripping gas preferably comprises $CO_2$, preferably comprises at least 80 vol % $CO_2$ based on total volume or even at least 95 vol % $CO_2$ based on total volume, most preferably the stripping gas consists substantially of $CO_2$, or in other words most preferably the stripping gas is $CO_2$. During operation, the conditions within the regeneration chamber(s) should be favourable for $CO_2$ desorption. The optimal conditions for $CO_2$ desorption may vary from sorbent to sorbent, they typically include ambient pressure and elevated temperature, although deviation thereof may occur without significantly jeopardizing the sorption efficiency of the device according to the invention. Optimal results are obtained with desorption at elevated temperature, such that the device according to the invention comprises heating means that are capable of heating the regeneration chamber, typically to a temperature in the range of 50-100° C., preferably in the range of 60-85° C., most preferably in the range of 67-75° C.

Thus, stripping gas enters is passed through the belt into the regeneration chamber. As desorption occurs during passage through the belt, the gas that enters the regeneration chamber is enriched in $CO_2$. In other words, the $CO_2$ content in the gas is increased compared to the incoming stripping gas. In case pure $CO_2$ is preferably used as stripping gas, the concentration of $CO_2$ therein typically remains the same (about 100 vol %), but the absolute amount of $CO_2$ molecules is increased in the gas that enters the regeneration chamber. A product stream comprising, typically consisting substantially of, $CO_2$ is discharged from the device according to the invention by the outlet.

Process

The process according to the invention is for capturing $CO_2$ from air and comprises:
 (i) moving a membrane comprising a macroporous layer, wherein the pores of the macroporous layer are coated with a solid state $CO_2$ sorbent, from a sorption section to a regeneration section;
 (ii) providing a flow of air through the membrane at the sorption section, to obtain air depleted in $CO_2$ and loaded solid state $CO_2$ sorbent;
 (iii) providing a flow of stripping gas through the membrane at the regeneration section, at elevated temperature, to obtain a product flow comprising $CO_2$ and regenerated solid state $CO_2$ sorbent.

Herein, sorption of $CO_2$ by the solid state $CO_2$ sorbent occurs at the sorption section, to obtain a loaded sorbent, and regeneration of the loaded sorbent occurs at the regeneration section, to obtain the regenerated solid state $CO_2$ sorbent. The sorption section thus corresponds with the sorption chamber in the device according to the invention, and the regeneration section corresponds with the regeneration chamber in the device according to the invention.

Notably, (i), (ii) and (iii) occur simultaneously, not consecutively, such that a continuous process can be performed. During (ii), sorption takes place, i.e. $CO_2$ molecules present in the air are adsorbed by the solid state $CO_2$ sorbent, such that the air that has passed through the membrane is depleted in $CO_2$ and the sorbent is loaded with $CO_2$. The moving of (i) ensures that the loaded sorbent is transported from a sorption section to a regeneration section. During (iii), regeneration takes place, i.e. $CO_2$ molecules adsorbed to the solid state $CO_2$ sorbent are desorbed by the stripping gas, such that the stripping gas that has passed through the membrane is enriched in $CO_2$ and the sorbent is regenerated and available for another sorption phase in (ii).

The condition during (ii) are such that sorption occurs, which may vary from sorbent to sorbent. These conditions typically include ambient pressure and temperature, although deviation thereof may occur without significantly jeopardizing the sorption efficiency of the process according to the invention. The condition during (iii) are such that sorption occurs, which includes elevated temperature. Elevated temperature herein refers to a temperature that is higher than the temperature during (ii). The optimal conditions for regeneration or $CO_2$ desorption may vary from sorbent to sorbent and typically include ambient pressure, although deviation thereof may occur without significantly jeopardizing the sorption efficiency of the device according to the invention. Optimal results are obtained with desorption at elevated temperature in the range of 50-100° C., preferably in the range of 60-85° C., most preferably in the range of 67-75° C. For the operation of the process according to the invention, the solid state $CO_2$ sorbent positioned on the membrane should be at the elevated temperature, and whether or not the surroundings thereof are also at elevated temperature is not important. After all, desorption occurs within the solid state $CO_2$ sorbent. The elevated temperature is preferably provided by the stripping gas being at the desired elevated temperature, and this warm stripping gas then heats up the solid state $CO_2$ sorbent during (iii). The process according to the invention preferably further comprises a step (iv), wherein the stripping gas is heated to the elevated temperature prior to being passed through the membrane during (iii).

During operation, the membrane moves, such that the sorbent passes from sorption chamber to regeneration chamber, to sorption chamber to regeneration chamber, and so on. Accordingly, the sorbent migrates from a sorption environment at reduced temperature (typically ambient temperature), i.e. the sorption section, to a regeneration environment at elevated temperature, i.e. the regeneration section. Thus, sorbent is loaded with $CO_2$ when the part of the membrane is located at the sorption chamber. Sorbent loaded with $CO_2$ is then conveyed towards a regeneration chamber, where the $CO_2$ molecules are desorbed and the sorbent is regenerated. Then, the regenerated sorbent is rotated towards a sorption chamber, and is used again for capturing $CO_2$ from air. The sequence of one sorption stage and one regeneration stage is herein referred to as a cycle. This sequence of steps may continue for an extended period of time, during which $CO_2$ is captured from the air in the sorption chamber, desorbed in the regeneration chamber and ends up in the $CO_2$ product flow.

During one full loop, the membrane passes through at least one sorption section and one regeneration section. Multiple of such sections are also possible, in line with the sorption and regeneration chambers as defined for the device according to the invention. The speed at which the membrane moves highly depends on the size of the membrane, the size (length) of the sorption and regeneration sections and the number of sorption and regeneration sections arranged around the membrane. For example, the speed may be such that the residence time of the solid state sorbent within a single sorption section is 0.05 s-1 min, preferably 0.1-10 s, more preferably 0.5-5 s. Having more sections thus means that the membrane may move slower. Because of the thinness of the sorption layer within the membrane, the sorbent may be saturated with $CO_2$ molecules within 0.1-60 seconds, preferably 0.1-10 seconds, more preferably 0.5-5 seconds. Regeneration typically occurs at the same time scales. In view of the rapid saturation, the residence time of the sorbent in each of the chambers is preferably short, preferably 0.1-60 seconds, more preferably 0.1-10 seconds, most 0.5-5 seconds.

In a preferred embodiment, the stripping gas is provided by a recycle from the product flow, wherein the product flow comprising $CO_2$ obtained in (iii) is separated into a product $CO_2$ flow and a recycle flow comprising stripping gas, and the recycle flow is recycled to (iii). Thus, the process according to the invention preferable further comprises a step (v), wherein the product flow comprising $CO_2$ obtained in (iii) is separated into a product $CO_2$ flow and a recycle flow comprising stripping gas.

For the preferred embodiment of the device having the form of a rotating cylinder, the process according to the invention comprises:

(i) rotating a cylinder having a circumferential wall around a central vertical axis, wherein the circumferential wall is at least partly permeable for air and is membrane composed of a macroporous layer, wherein the pores of the macroporous layer are coated with a solid state $CO_2$ sorbent;

(ii) providing a flow of air through the circumferential wall at a sorption section, to obtain air depleted in $CO_2$ and loaded solid state $CO_2$ sorbent;

(iii) providing a flow of stripping gas through the circumferential wall at a regeneration section, at elevated temperature, to obtain a product flow comprising $CO_2$ and regenerated solid state $CO_2$ sorbent.

Herein, at the sorption section sorption of $CO_2$ by the solid state $CO_2$ sorbent occurs to obtain a loaded sorbent and at the regeneration section regeneration of the loaded sorbent occurs to obtain regenerated solid state $CO_2$ sorbent.

Notably, (i), (ii) and (iii) occur simultaneously, not consecutively, such that a continuous process can be performed. During (ii), sorption takes place, i.e. $CO_2$ molecules present in the air are adsorbed by the solid state $CO_2$ sorbent, such that the air that has passed through the circumferential wall is depleted in $CO_2$ and the sorbent is loaded with $CO_2$. During (iii), regeneration takes place, i.e. $CO_2$ molecules adsorbed to the solid state $CO_2$ sorbent are desorbed by the stripping gas, such that the stripping gas that has passed through the circumferential wall is enriched in $CO_2$ and the sorbent is regenerated and available for another sorption phase in (ii).

The condition during (ii) are such that sorption occurs, which may vary from sorbent to sorbent These conditions typically include ambient pressure and temperature, although deviation thereof may occur without significantly jeopardizing the sorption efficiency of the process according to the invention. The condition during (iii) are such that sorption occurs, which includes elevated temperature. Elevated temperature herein refers to a temperature that is higher than the temperature during (ii). The optimal conditions for regeneration or $CO_2$ desorption may vary from sorbent to sorbent and typically include ambient pressure, although deviation thereof may occur without significantly jeopardizing the sorption efficiency of the device according to the invention. Optimal results are obtained with desorption at elevated temperature in the range of 50-100° C., preferably in the range of 60-85° C., most preferably in the range of 67-75° C. For the operation of the process according to the invention, the solid state $CO_2$ sorbent positioned on the circumferential wall should be at the elevated temperature, and whether or not the surroundings thereof are also at elevated temperature is not important. After all, desorption occurs within the solid state $CO_2$ sorbent. The elevated temperature is preferably provided by the stripping gas being at the desired elevated temperature, and this warm stripping gas then heats up the solid state $CO_2$ sorbent during (iii). The process according to the invention this preferable further comprises (iv), wherein the stripping gas is heated to the elevated temperature prior to being passed through the circumferential wall during (iii).

During operation, the circumferential wall rotates, such that the sorbent passes from sorption chamber to regeneration chamber, to sorption chamber to regeneration chamber, and so on. Accordingly, the sorbent migrates from a sorption environment at reduced temperature (typically ambient temperature), i.e. the sorption section, to a regeneration environment at elevated temperature, i.e. the regeneration section. Thus, sorbent is loaded with $CO_2$ when the part of the circumferential wall is located at the sorption chamber. Sorbent loaded with $CO_2$ is then rotated towards a regeneration chamber, where the $CO_2$ molecules are desorbed and the sorbent is regenerated. Then, the regenerated sorbent is rotated towards a sorption chamber, and is used again for capturing $CO_2$ from air. The sequence of one sorption stage and one regeneration stage is herein referred to as a cycle. This sequence of steps may continue for an extended period of time, during which $CO_2$ is captured from the air in the sorption chamber, desorbed in the regeneration chamber and ends up in the $CO_2$ product flow.

During one full rotation, the circumferential wall passes through at least one sorption section and one regeneration section. Multiple of such sections are also possible, in line with the sorption and regeneration chambers as defined for the device according to the invention. The speed at which the circumferential wall rotates highly depends on the diameter of the circumferential wall and the size (length) of the sorption and regeneration sections and the number of sorption and regeneration sections arranged around the circumferential wall. For example, the rotational speed may be such that the residence time of the solid state sorbent within a single sorption section is 0.05 s-1 min, preferably 0.1-10 s, more preferably 0.5-5 s. Having more sections thus means that the circumferential wall may rotate slower.

Because of the thinness of the sorption layer on the circumferential wall, the sorbent may be saturated with $CO_2$ molecules within 0.1-60 seconds, preferably 0.1-10 seconds, more 0.5-5 seconds. Regeneration typically occurs at the same time scales. In view of the rapid saturation, the residence time of the sorbent in each of the chambers should be short, preferably 0.1-60 seconds, more preferably 0.1-10 seconds, most preferably 0.5-5 seconds.

For the preferred embodiment of the device having the form of a moving belt, the process according to the invention comprises:

(i) conveying a belt which is at least partly permeable for air and onto which a membrane composed of a macroporous layer, wherein the pores of the macroporous layer are coated with a solid state $CO_2$ sorbent is positioned, through sorption and regeneration section (s);

(ii) providing a flow of air through the belt at a sorption section, to obtain air depleted in $CO_2$ and loaded solid state $CO_2$ sorbent;

(iii) providing a flow of stripping gas through the belt at a regeneration section, at elevated temperature, to obtain a product flow comprising $CO_2$ and regenerated solid state $CO_2$ sorbent.

Herein, at the sorption section sorption of $CO_2$ by the solid state $CO_2$ sorbent occurs to obtain a loaded sorbent and at the regeneration section regeneration of the loaded sorbent occurs to obtain regenerated solid state $CO_2$ sorbent.

Notably, (i), (ii) and (iii) occur simultaneously, not consecutively, such that a continuous process can be performed. During (ii), sorption takes place, i.e. $CO_2$ molecules present in the air are adsorbed by the solid state $CO_2$ sorbent, such that the air that has passed through the belt is depleted in $CO_2$ and the sorbent is loaded with $CO_2$. During (iii), regeneration takes place, i.e. $CO_2$ molecules adsorbed to the solid state $CO_2$ sorbent are desorbed by the stripping gas, such that the stripping gas that has passed through the belt is enriched in $CO_2$ and the sorbent is regenerated and available for another sorption phase in (ii).

The condition during (ii) are such that sorption occurs, which may vary from sorbent to sorbent These conditions typically include ambient pressure and temperature, although deviation thereof may occur without significantly jeopardizing the sorption efficiency of the process according to the invention. The condition during (iii) are such that sorption occurs, which includes elevated temperature. Elevated temperature herein refers to a temperature that is higher than the temperature during (ii). The optimal conditions for regeneration or $CO_2$ desorption may vary from sorbent to sorbent and typically include ambient pressure, although deviation thereof may occur without significantly jeopardizing the sorption efficiency of the device according to the invention. Optimal results are obtained with desorption at elevated temperature in the range of 50-100° C., preferably in the range of 60-85° C., most preferably in the range of 67-75° C. For the operation of the process according to the invention, the solid state $CO_2$ sorbent positioned on the belt should be at the elevated temperature, and whether or not the surroundings thereof are also at elevated temperature is not important. After all, desorption occurs within the solid state $CO_2$ sorbent. The elevated temperature is preferably provided by the stripping gas being at the desired elevated temperature, and this warm stripping gas then heats up the solid state $CO_2$ sorbent during (iii). The process according to the invention this preferable further comprises (iv), wherein the stripping gas is heated to the elevated temperature prior to being passed through the belt during (iii).

During operation, the belt is moved, such that the sorbent passes from sorption chamber to regeneration chamber, to sorption chamber to regeneration chamber, and so on. Accordingly, the sorbent migrates from a sorption environment at reduced temperature (typically ambient temperature), i.e. the sorption section, to a regeneration environment at elevated temperature, i.e. the regeneration section. Thus, sorbent is loaded with $CO_2$ when the part of the belt is located at the sorption chamber. Sorbent loaded with $CO_2$ is then rotated towards a regeneration chamber, where the $CO_2$ molecules are desorbed and the sorbent is regenerated. Then, the regenerated sorbent is rotated towards a sorption chamber, and is used again for capturing $CO_2$ from air. The sequence of one sorption stage and one regeneration stage is herein referred to as a cycle. This sequence of steps may continue for an extended period of time, during which $CO_2$ is captured from the air in the sorption chamber, desorbed in the regeneration chamber and ends up in the $CO_2$ product flow.

During one full loop, the belt passes through at least one sorption section and one regeneration section. Multiple of such sections are also possible, in line with the sorption and regeneration chambers as defined for the device according to the invention. The speed at which the belt moves highly depends on the length of the trajectory of the loop (or length of the belt), the size (length) of the sorption and regeneration sections and the number of sorption and regeneration sections arranged around the belt. For example, the speed may be such that the residence time of the solid state sorbent within a single sorption section is 0.05 s-1 min, preferably 0.1-10 s, more preferably 0.5-5 s. Having more sections thus means that the belt may move slower.

Because of the thinness of the sorption layer, the sorbent may be saturated with $CO_2$ molecules within 0.1-10 seconds, preferably 0.5-5 seconds. Regeneration typically occurs at the same time scales. In view of the rapid saturation, the residence time of the sorbent in each of the chambers should be short, preferably 0.1-10 seconds, preferably 0.5-5 seconds.

Uses

As explained above, the present invention centres around the use of a membrane composed of a porous layer, wherein the pores of the porous layer are coated with a solid state $CO_2$ sorbent, herein also referred to as "thin layer", for capturing gaseous molecules, in particular $CO_2$, from air. Herein, the membrane refers to the macroporous layer as further defined herein. In one embodiment, the membrane contains a porous layer, instead of a macroporous layer. The invention thus also concerns the use of membrane composed of a porous layer, typically a macroporous layer, wherein the pores of that layer are coated with a solid state sorbent, for capturing a gaseous species from air. Herein, the sorbent is selective for the gaseous species to be captured. The skilled person is aware of such sorbents and knows how to select one.

Although it is especially preferred to use the membrane for capturing $CO_2$, as set out above, other gaseous species may also be captured using the membrane according to the invention. Preferred species include sulphur oxides and nitrogen oxides, preferably $SO_x$ and/or $NO_x$. Sorbents selective for those species are known in the art, and include calcium and copper oxides (e.g. $CaO_x$, $CuO_x$).

The membrane is porous, to enable the flow of gas through the membrane. Preferably, the flow of gas is perpendicular to the membrane. In a preferred embodiment, the average pore size is in the range of 5-250 nm, more preferably in the range of 10-50 nm. In a preferred embodiment, the membrane is composed of a porous thin film membrane layer, wherein the pores of the layer are coated with a solid state $CO_2$ sorbent. The membrane may contain a backing layer, such as a microporous backing layer, that may serve as a support for the macroporous top layer. The microporous backing layer can be grown on top of the microporous backing layer. The backing layer is preferably formed by an inert metal mesh, such as a mesh from copper wire. The membrane typically comprises an inert porous material, such as amorphous silicon, onto which the sorbent is coated. As such, a thin film is formed, through which air can flow with minimal pressure difference over the membrane.

In an even further embodiment, the membrane is used to capture gaseous molecules from a gas mixture other than air. The molecule to be captured may be present in small or large quantities, such as up to 15 vol. % or up to 10 vol. %. In a preferred embodiment, the gas mixture is characterized by its low content of the gaseous molecules to be captured, which is typically less than 0.5 vol. %, or even less than 0.1 vol. %. The invention is suitable to remove such gaseous molecules that are present in low content, as illustrated by $CO_2$ removal from air (air has a $CO_2$ content of only 0.04 vol. %). In a preferred embodiment, $CO_2$ is captured from the gas mixture.

The use according to the invention is preferably performed with the device according to the invention. Likewise, it is preferred that the use according to the invention employs the process according to the invention.

The device according to the invention is a great improvement over known devices for capturing $CO_2$ from air. First and foremost, because of its high efficiency, sufficient $CO_2$ can be captured to provide an economically viable process. In other words, the operating costs (OPEX) of the device according to the invention are significantly reduced compared to known devices. Furthermore, the device according to the present invention provides a product stream of pure $CO_2$, such that no further separation techniques are required. The OPEX of the present invention has been compared to the OPEX of the prior art system wherein $CO_2$ is captured from air using an aqueous solution of sodium hydroxide (see Keith et al., *A process for capturing $CO_2$ from the atmo-* sphere, in *Joule* 2, 2018, 1573-1594). Where the prior art device is estimated to operate for 172 USD per ton $CO_2$ for the first plant, reduced to 134 USD per ton $CO_2$ for the $n^{th}$ plant, the present device is estimated to operate for 75 USD per ton $CO_2$ for the first plant, reduced to 58 USD per ton $CO_2$ for the $n^{th}$ plant. Energy costs are estimated to be reduced from 33 USD/ton $CO_2$ for the prior art device to 15 USD/ton $CO_2$ for the device according to the invention.

Additionally, the capital expenditure (CAPEX) of the device according to the invention is reduced with respect to prior art devices. For example, the prior art system wherein $CO_2$ is captured from air using an aqueous solution of sodium hydroxide is calculated to be 1100 million USD for a plant that captures 1 Mton $CO_2$ annually (700 million USD for building the plant and 400 million USD indirect costs), see Keith et al. The CAPEX of the device according to the invention is calculated to be 480 million USD, which includes 300 million USD for building and 180 million USD indirect costs. The device according to the present invention basically requires the air-contactor unit, compared to the device of Keith et al.

A further advantage of the device according to the invention is that it is fully scalable to the needs of the user. Parameters that can be adjusted to the specific situation include, size of the membrane (e.g. the diameter of the circumferential wall, the height of the cylinder, the width and length of the belt), the speed of the movement (e.g. the rotational speed of the cylinder, the conveying speed of the belt), the amount of chambers and the amount of thin films stacked on top of each other. Especially for its application during the energy transition, wherein society is slowly switching to renewable source, the scalable system can be implemented in many situations and adapted to the requirements of that situation, including industrial scale devices for capturing millions of tonnes of $CO_2$ yearly and small scale domestic devices for capturing amounts of $CO_2$ that are factors lower.

FIGURES

FIGS. 1-5 depict preferred embodiments of the device and process according to the invention.

FIG. 1 depicts a cylindrical device wherein the membrane (a) in the form of a circumferential wall is positioned around vertical axis (a2). Within the circumferential wall, one sorption chamber (b) and one regeneration chamber (c) is positioned, which are divided by a dividing wall (solid black). On the sorption side, the device contains an inlet (e7) for receiving air (A), and on the other side of the circumferential wall (a), in the bottom of sorption chamber (b), an outlet (e2) for discharging air depleted in $CO_2$. On the regeneration side, the device contains an inlet (f1) for receiving the stripping gas (B), and on the other side of the circumferential wall (a), in the bottom of regeneration chamber (c), an outlet (g) for discharging the product flow comprising $CO_2$.

Figure 2:
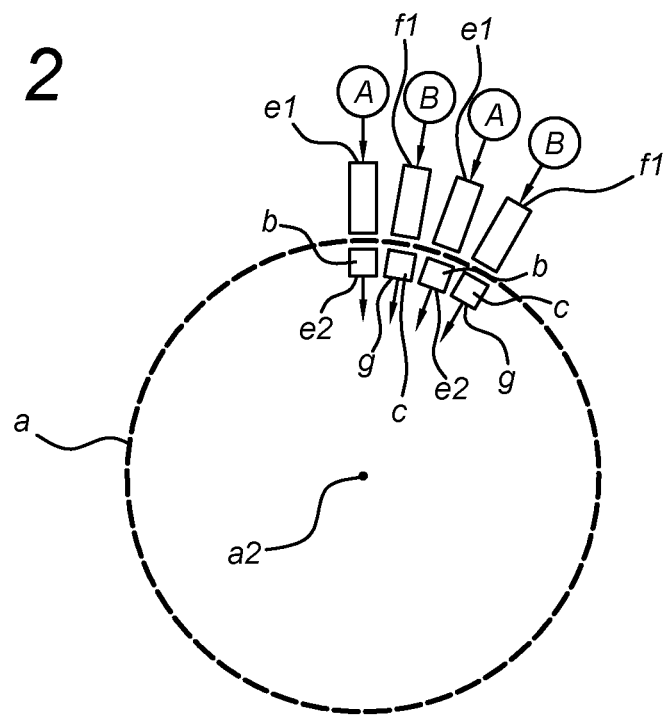

FIG. 2 depicts a device having a multitude of sorption chambers (b) and regeneration chambers (c) arranged around a membrane (a) in the form of a circumferential wall positioned around vertical axis (a2). Each sorption chamber (b) has an inlet (e7) for receiving air (A), and on the other side of the circumferential wall (a) an outlet (e2) for discharging air depleted in $CO_2$. Each regeneration chamber (c) has an inlet (f1) for receiving the stripping gas (B), and on the other side of the circumferential wall (a), an outlet (g) for discharging the product flow comprising $CO_2$.

Figure 3:
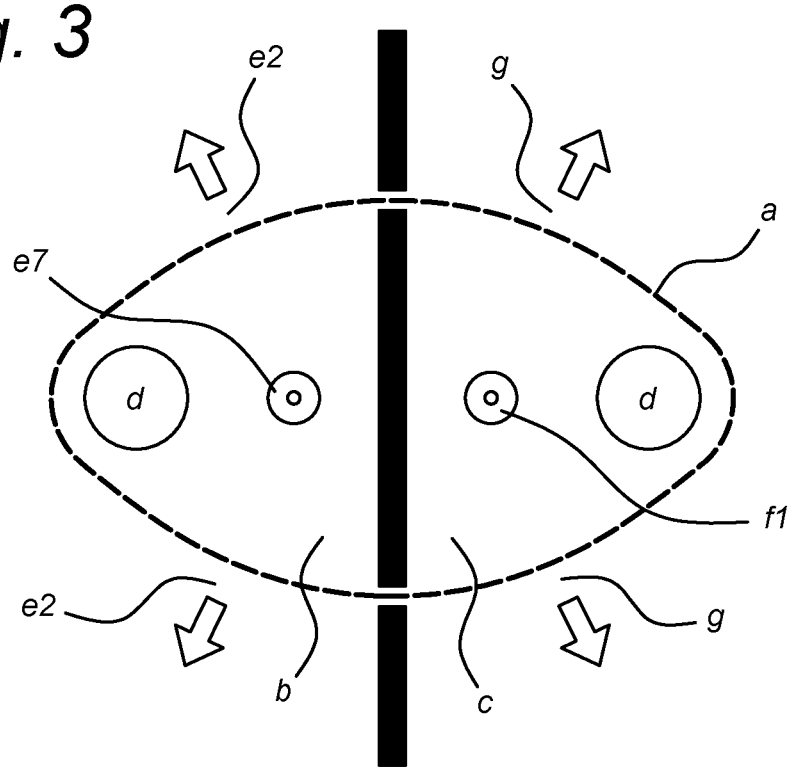

FIG. 3 depicts a belt (a) onto which a membrane is positioned. The belt contains conveying means (d) to circulate the belt through the sorption camber (b) and regeneration chamber (c). One sorption chamber (b) and one regeneration chamber (c) is positioned, which are divided by a dividing wall (solid black). On the sorption side, the device contains an inlet (e7) for receiving air, and on the other side of the membrane (a), outlets (e2) for discharging air depleted in $CO_2$. On the regeneration side, the device contains an inlet (f1) for receiving the stripping gas, and on the other side of the membrane (a), outlets (g) for discharging the product flow comprising $CO_2$.

Figure 4:
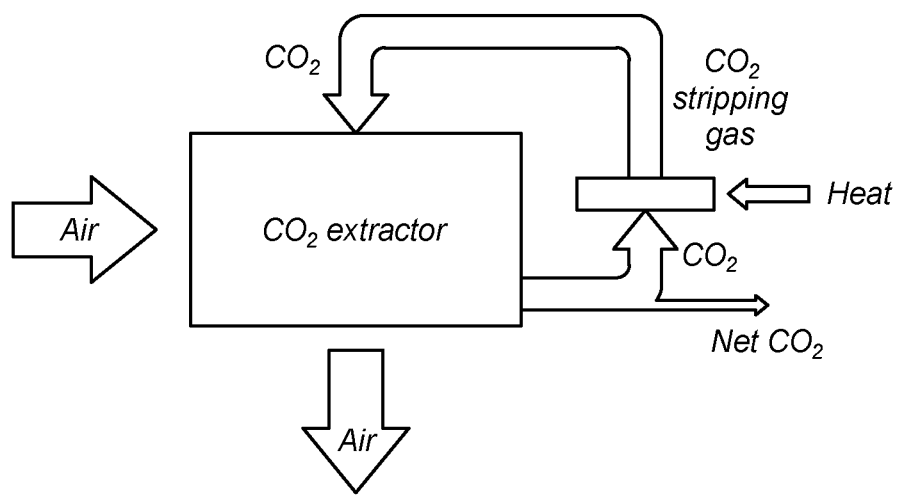

FIG. 4 shows a schematic representation of an embodiment of the process of the invention. The $CO_2$ extractor depicted in FIG. 4 is a combined representation of the membrane, the sorption section and the regeneration section, typically formed by the device according to the invention. Air enters the $CO_2$ extractor at a certain temperature (e.g. 20° C.). $CO_2$ adsorption occurs at the sorption section, thereby obtaining a membrane with loaded solid state $CO_2$ adsorbent and air depleted in $CO_2$ (e.g. at a temperature of 30° C.), which is discharged from the $CO_2$ extractor. A stripping gas at elevated temperature (e.g. at 70° C.) is led through the membrane at the regeneration section of the $CO_2$ extractor to regenerate the sorbent, thereby obtaining a product flow comprising $CO_2$ (net $CO_2$ outflow), typically at a slightly reduced temperature, e.g. at 60° C. Part of the product flow is recycled and after heating to the desired stripping temperature reused as stripping gas.

Figure 5:
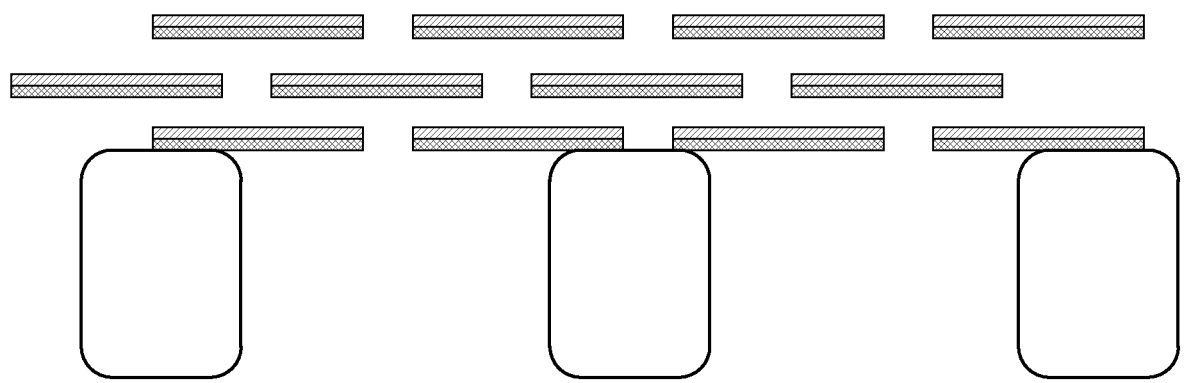

FIG. 5 shows a membrane composed of a stack of thin films (lower layer, cross-shading), each of which have small holes (e.g. 100-200 μm diameter) that allow air to pass through. Each thin film is coated with a porous coating (upper layer, line-shading), in the pores of which the sorbent is coated. The rectangular shapes at the bottom represent a supporting layer on which the thin films are positioned. This supporting layer may for example be a rotating drum or a moving belt. The supporting layer has large holes (spaces between the rectangular shapes), e.g. 0.1-5 mm. The arrows represent the flow of air or stripping gas going through the membrane to load or regenerate the sorbent in the porous top layer.

The invention claimed is:

1. A device for capturing $CO_2$ from air, comprising:
   (a) a membrane at least partly permeable for air, composed of a macroporous layer, wherein the pores of the macroporous layer are coated with a solid state $CO_2$ sorbent;
   (b) at least one sorption chamber;
   (c) at least one regeneration chamber;
   (d) a membrane transporter configured to move the membrane from the sorption chamber to the regeneration chamber and back;
   (e) an inlet for receiving air located on one side of the membrane and an outlet for discharging air depleted in $CO_2$ located on the other side of the membrane in the sorption chamber, wherein the device is configured to allow air to flow from the inlet to the outlet through the membrane;
   (f) an inlet for receiving stripping gas on one side of the membrane;
   (g) at least one outlet for discharging $CO_2$, located on the other side of the membrane in the regeneration chamber; and
   (h) a heater configured for heating the regeneration chamber, wherein the membrane has the form of a closed loop.

2. The device according to claim 1, wherein the device further comprises:
(a) a cylinder comprising the membrane in the shape of a circumferential wall centered around a central axis;
wherein the membrane transporter is configured for rotating the cylinder around the central axis, and wherein the sorption chamber(s) are delimited by part of the circumferential wall and a dividing wall; wherein the regeneration chamber(s) are delimited by another part of the circumferential wall and a dividing wall.

3. The device according to claim 1, wherein the device further comprises:
(a) a belt comprising the membrane as a separate layer;
wherein the membrane transporter is configured for conveying the belt through the sorption and regeneration chamber(s); and wherein the sorption chamber(s) are delimited by part of the membrane and a dividing wall, wherein the regeneration chamber(s) are delimited by another part of the membrane and a dividing wall.

4. The device according to claim 1, further comprising a $CO_2$ recycle (j) that is configured to flow stripping gas through the membrane into the regeneration chamber (c), wherein the recycle comprises a separator configured to separate a product $CO_2$ flow from the recycle flow, wherein the product $CO_2$ flow is capable of being discharged by the outlet (g) for discharging $CO_2$ and the recycle flow is returned to the regeneration chamber (c).

5. The device according to claim 1, wherein the heater is adapted to heat the solid state $CO_2$ sorbent when positioned adjacent to or within the regeneration chamber to a temperature in the range of 50-100° C.

6. The device according to claim 1, wherein the heater is adapted to heat the stripping gas that flows through the membrane into the regeneration chamber.

7. The device according to claim 1, which comprises 1-20 sorption chambers and 1-20 regeneration chambers.

8. The device according to claim 1, wherein the $CO_2$ sorbent is selected from the group consisting of bicarbonate-based sorbents, amine-based sorbents and metal-organic frameworks.

9. The device according to claim 1, wherein the junction between sorption and regeneration chambers is substantially air tight.

10. The device according to claim 1, wherein the heater is adapted to heat the regeneration chamber to a temperature above the temperature of the sorption chamber.

11. The device according to claim 1, wherein the sorption chambers and the regeneration chambers are positioned alternatingly around the trajectory of the membrane loop.

12. The device according to claim 1, wherein the membrane is configured to continuously revolve as the device is in use.

13. The device according to claim 1, wherein the stripping gas is selected from the group consisting of nitrogen, steam, helium, and $CO_2$.

14. A process for capturing $CO_2$ from air, comprising:
(i) moving a membrane composed of a macroporous layer, wherein the pores of the macroporous layer are coated with a solid state $CO_2$ sorbent, from a sorption section to a regeneration section;
(ii) providing a flow of air through the membrane at the sorption section, to obtain air depleted in $CO_2$ and loaded solid state $CO_2$ sorbent;
(iii) providing a flow of stripping gas through the membrane at the regeneration section, at elevated temperature, to obtain a product flow comprising $CO_2$ and regenerated solid state $CO_2$ sorbent;
wherein sorption of $CO_2$ by the solid state $CO_2$ sorbent occurs at the sorption section to obtain a loaded sorbent, and regeneration of the loaded sorbent occurs at the regeneration section to obtain regenerated solid state $CO_2$ sorbent.

15. The process according to claim 14, wherein the moving of step (i) involves rotating a cylinder having a circumferential wall around a central axis, wherein the circumferential wall comprises the membrane.

16. The process according to claim 14, wherein the moving of step (i) involves conveying a belt through the sorption and regeneration sections, wherein the belt comprises the membrane.

17. The process according to claim 14, wherein the stripping gas is provided by a recycle from the product flow, wherein the product flow comprising $CO_2$ obtained in (ii) is separated into a product $CO_2$ flow and a recycle flow comprising stripping gas, and the recycle flow is recycled to (ii).

18. The process according to claim 14, further comprising:
(iv) heating the stripping gas to the elevated temperature prior to being passed through the membrane during (ii).

19. A method for capturing a gaseous species from air, comprising contacting air with a membrane composed of a macroporous layer, wherein the pores of the macroporous layer are coated with a solid state sorbent, wherein the sorbent is selective for the gaseous species.

20. The method according to claim 19, wherein the gaseous species is selected from carbon oxides, sulphur oxides and nitrogen oxides.

* * * * *